US009694428B2

(12) United States Patent
Tussing

(10) Patent No.: US 9,694,428 B2
(45) Date of Patent: Jul. 4, 2017

(54) TOOL ATTACHMENT FOR A HAND-HELD MACHINE TOOL

(71) Applicant: Robert Bosch GmbH, Stuttgart (DE)

(72) Inventor: Torsten Tussing, Illertissen (DE)

(73) Assignee: Robert Bosch GmbH, Stuttgart (DE)

( * ) Notice: Subject to any disclaimer, the term of this patent is extended or adjusted under 35 U.S.C. 154(b) by 535 days.

(21) Appl. No.: 14/084,338

(22) Filed: Nov. 19, 2013

(65) Prior Publication Data

US 2015/0115554 A1 Apr. 30, 2015
US 2016/0008893 A9 Jan. 14, 2016

(30) Foreign Application Priority Data

Nov. 22, 2012 (DE) .......................... 10 2012 221 320
Jul. 15, 2013 (DE) .......................... 10 2013 213 804

(51) Int. Cl.
*B23B 31/12* (2006.01)
*B25F 3/00* (2006.01)

(52) U.S. Cl.
CPC .............. *B23B 31/123* (2013.01); *B25F 3/00* (2013.01); *B23B 31/12* (2013.01);
(Continued)

(58) Field of Classification Search
CPC . B23B 31/113; B23B 31/117; B23B 31/1173; B23B 31/1177; B23B 31/123; B23B 31/16; B23B 31/1253; B23B 2240/04; B23B 45/003; B25B 21/007; B25B 23/0035; B25D 17/005; B25D 17/08; Y10T 408/957; Y10T 408/953; Y10T 408/95; Y10T 408/94; Y10T 279/26;
(Continued)

(56) References Cited

U.S. PATENT DOCUMENTS 3,545,776 A * 12/1970 Haviland .............. B23B 31/123
            279/63
3,929,343 A * 12/1975 Wanner ................. B23B 31/113
            279/62

(Continued)

FOREIGN PATENT DOCUMENTS

CN      1370657 A      9/2002
CN    200942566 Y      9/2007
(Continued)

*Primary Examiner* — Sunil K Singh
*Assistant Examiner* — Nicole N Ramos
(74) *Attorney, Agent, or Firm* — Norton Rose Fulbright US LLP; Gerard Messina

(57) ABSTRACT

In a tool attachment for fastening to a fastening interface of a hand-held machine tool, having a locking unit which in an unlocked state makes it possible for the tool attachment to be placed on the fastening interface of the hand-held machine tool and in a locked state makes it possible for the tool attachment to be locked to the fastening interface of the hand-held machine tool for operation, the locking unit having a rotatable locking body, and a first rotational position of the locking body being associated with the unlocked state and a second rotational position of the locking body being associated with the locked state, the locking unit has a locking member which is configured to prevent rotation of the locking body from the second rotational position into the first rotational position in the locked state.

15 Claims, 9 Drawing Sheets

(52) U.S. Cl.
 CPC ... *B23B 2240/04* (2013.01); *Y10T 279/17615* (2015.01); *Y10T 279/32* (2015.01); *Y10T 408/95* (2015.01)

(58) Field of Classification Search
 CPC ......... Y10T 279/3406; Y10T 279/3412; Y10T 279/3418
 See application file for complete search history.

(56) References Cited

U.S. PATENT DOCUMENTS

| | | | | |
|---|---|---|---|---|
| 4,824,298 | A * | 4/1989 | Lippacher | B23B 31/008 173/48 |
| 5,240,360 | A * | 8/1993 | Esser | B23Q 3/12 408/238 |
| 5,342,154 | A * | 8/1994 | Holzer | B23Q 3/12 279/143 |
| 5,624,125 | A * | 4/1997 | Rohm | B23B 31/1238 279/140 |
| 6,293,559 | B1 * | 9/2001 | Harman, Jr. | B23Q 3/12 279/143 |
| 6,551,037 | B2 * | 4/2003 | Gifford | B23Q 3/12 279/145 |
| 6,688,611 | B2 * | 2/2004 | Gifford | B23Q 3/12 279/143 |
| 2005/0127618 | A1 * | 6/2005 | Baumann | B23B 31/1238 279/60 |

FOREIGN PATENT DOCUMENTS

| | | |
|---|---|---|
| CN | 101204739 A | 6/2008 |
| CN | 101372042 A | 2/2009 |
| DE | 202006014850 U1 | 11/2006 |

\* cited by examiner

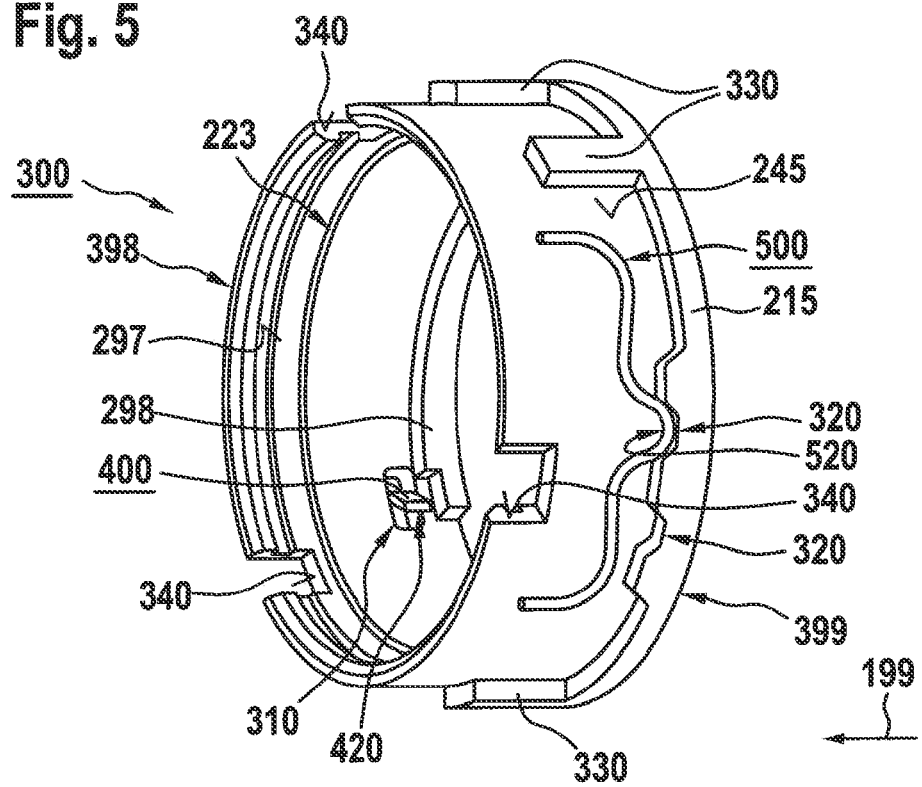
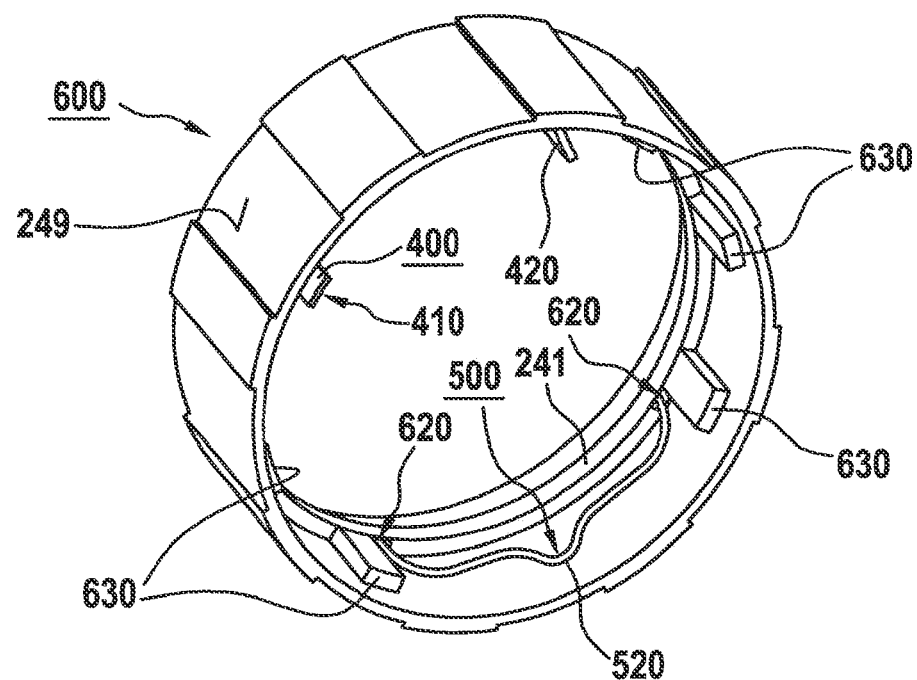

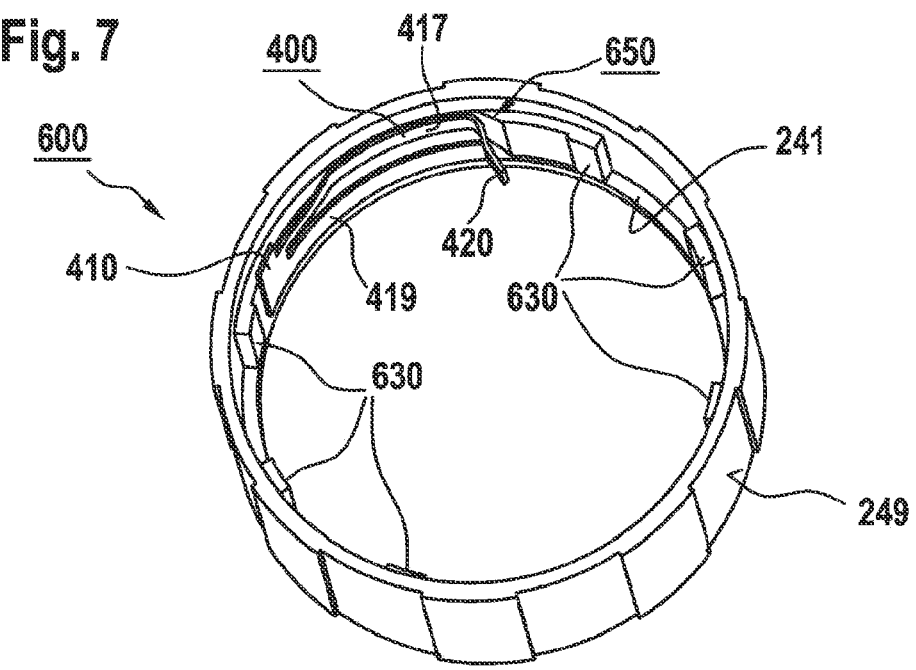
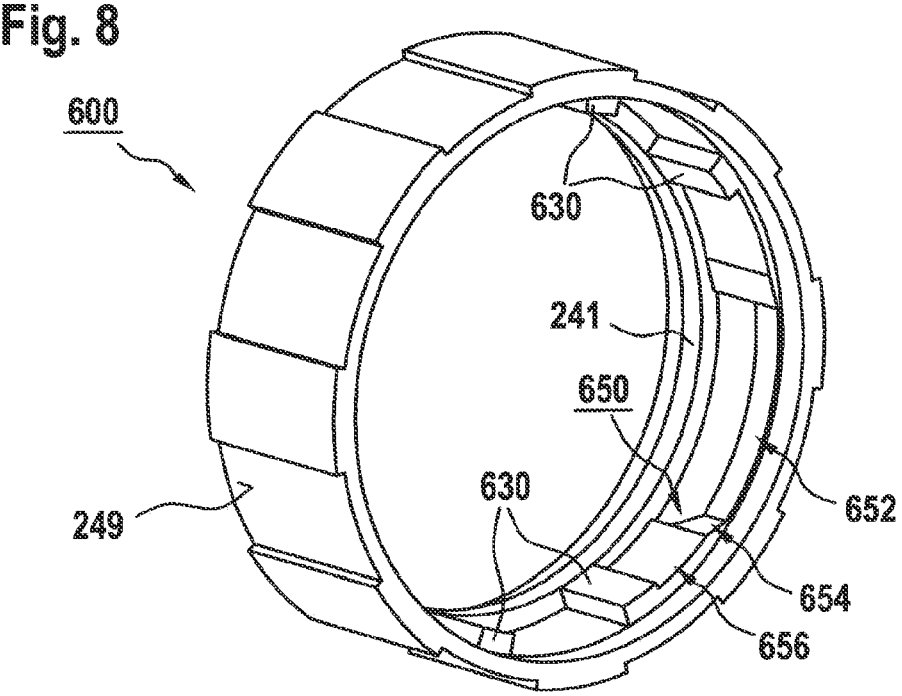

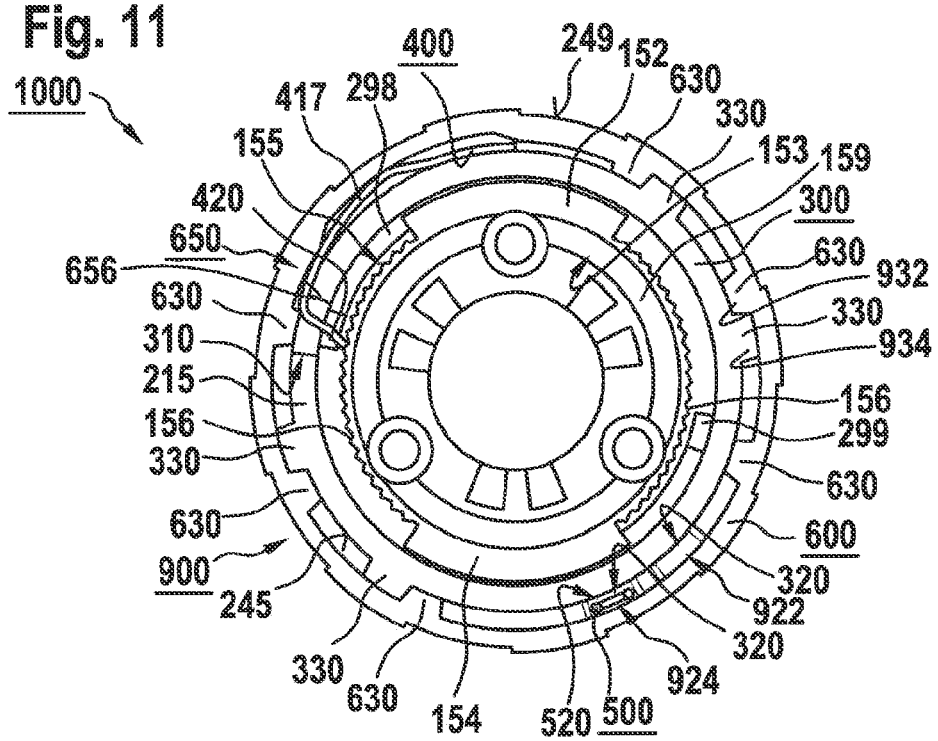
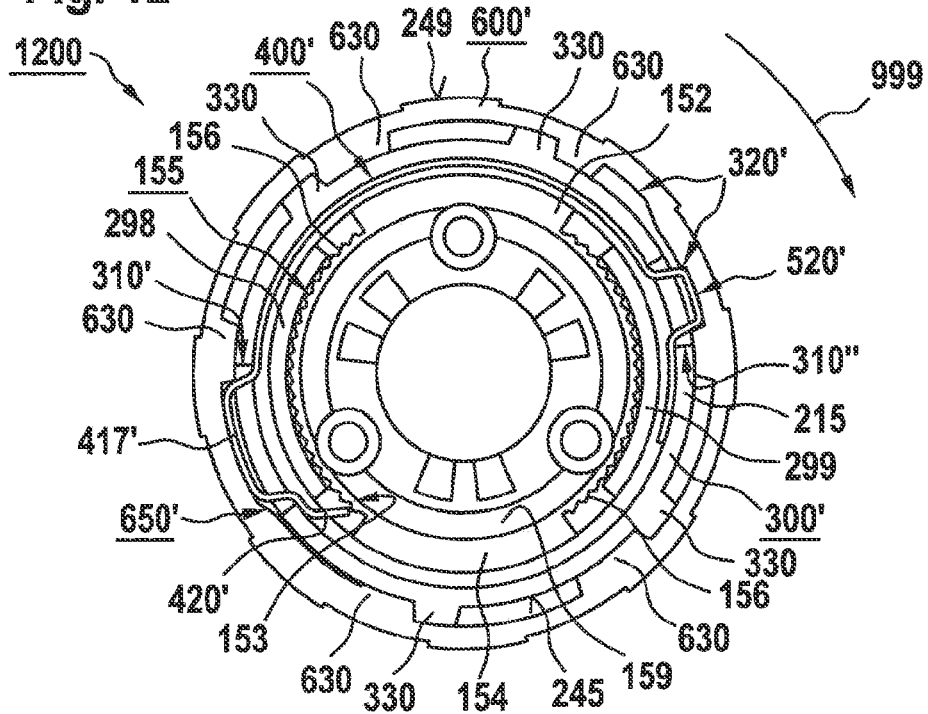

TOOL ATTACHMENT FOR A HAND-HELD MACHINE TOOL

CROSS REFERENCE TO RELATED APPLICATION

The present application claims priority to Application No. DE 10 2012 221 320.1, filed in the Federal Republic of Germany on Nov. 22, 2012, and Application No. DE 10 2013 213 804.0, filed in the Federal Republic of Germany on Jul. 15, 2013, the contents of each of which are expressly incorporated herein by reference thereto.

FIELD OF INVENTION

The present invention relates to a tool attachment for fastening to a fastening interface of a hand-held machine tool, having a locking unit which in an unlocked state makes it possible for the tool attachment to be placed on the fastening interface of the hand-held machine tool and in a locked state makes it possible for the tool attachment to be locked to the fastening interface of the hand-held machine tool for operation, the locking unit having a rotatable locking body which in the unlocked state is disposed in a first rotational position and in the locked state is disposed in a second rotational position on the fastening interface of the hand-held machine tool.

BACKGROUND INFORMATION

A tool attachment which has a locking unit for fastening to a fastening interface of a hand-held machine tool is known from the related art. That locking unit serves to lock the tool attachment to the hand-held machine tool in an associated locked state in order to render possible operation of the tool attachment on the hand-held machine tool by transfer of a driving torque from the hand-held machine tool to the tool attachment. For that purpose, the locking unit has a rotatable locking body on which locking elements configured in the manner of bayonets are provided to form a bayonet connection with the fastening interface of the hand-held machine tool.

A disadvantage with the related art is that such a bayonet connection may come undone automatically as a result of vibrations which occur in operation of the hand-held machine tool. That may result in damage to the tool attachment and/or to the hand-held machine tool and also in injuries to the user of the hand-held machine tool.

SUMMARY

It is therefore an object of the present invention to provide a novel tool attachment for fastening to a fastening interface of a hand-held machine tool, with which, after locking to the fastening interface of the hand-held machine tool, automatic detachment therefrom may be prevented.

That object is attained by a tool attachment for fastening to a fastening interface of a hand-held machine tool, having a locking unit which in an unlocked state makes it possible for the tool attachment to be placed on the fastening interface of the hand-held machine tool and in a locked state makes it possible for the tool attachment to be locked to the fastening interface of the hand-held machine tool for operation. The locking unit has a rotatable locking body, a first rotational position of the locking body being associated with the unlocked state and a second rotational position of the locking body being associated with the locked state. The locking unit has a locking member which is configured to prevent rotation of the locking body from the second rotational position into the first rotational position in the locked stated.

The present invention accordingly makes it possible to provide a tool attachment with which, in operation of an associated hand-held machine tool to which the tool attachment is locked in the locked state, an automatic detachment of the locking body of the tool attachment from the fastening interface of the hand-held machine tool may be safely and reliably prevented by the locking member.

According to one exemplary embodiment, the locking member is configured to cooperate in the locked state with a locking element associated with the fastening interface of the hand-held machine tool.

It is thus possible to provide in a simple manner a stable and robust locking arrangement.

The locking element has preferably at least one set of locking teeth.

It is thus possible to provide a locking element that may be produced quickly and in an uncomplicated manner.

According to one exemplary embodiment, the locking member is of a resilient configuration at least in regions and has at least one locking portion which in the locked state is urged toward the fastening interface of the hand-held machine tool by an elastic deformation of the locking member.

The present invention thus makes it possible to provide a locking member that is safe in operation and inexpensive.

Preferably, the locking portion is configured to engage the set of locking teeth in the locked state in order to prevent the rotation of the locking body from the second rotational position into the first rotational position.

Thus, a safe and robust blocking of an automatic rotation of the locking body in the locked state of the locking unit may be made possible.

According to one exemplary embodiment, the locking unit has an actuating element which is configured to make possible a rotation of the locking body from the first into the second rotational position.

The present invention thus makes it possible to provide a tool attachment whose locking unit is configured for simple and user-friendly handling.

The locking body is preferably at least partly tubular and the actuating element is rotatably supported on the outer periphery of the locking body.

Thus, stable and uncomplicated supporting of the actuating element on the locking body may be made possible.

According to one exemplary embodiment, at least one driver element is provided on the actuating element and at least one driven member is provided on the locking body, the driver element and the driven member being configured to cooperate for rotary entrainment of the locking body upon actuation of the actuating element to rotate the locking body from the first into the second rotational position.

The present invention thus makes it possible to provide a tool attachment in which safe and reliable rotary entrainment of the locking body by the actuating element may be ensured.

Preferably, the driven member is configured to make possible a rotational movement of the actuating element relative to the locking body at least by a predetermined rotation angle.

Thus, a relative movement between actuating element and locking body may be made possible, which relative movement may be used according to the present invention to activate or deactivate the locking member.

The actuating element is preferably configured to urge the locking member in the locked state at least in portions toward the fastening interface of the hand-held machine tool.

Thus, the locking function of the locking member in the locked state of the locking unit may be effectively maintained by the actuating element.

Preferably, the actuating element has a control curve which is configured to enable the locking member to be urged at least in portions toward the fastening interface of the hand-held machine tool in the locked state.

Thus, a stable urging of the locking member in the locked state of the locking unit may be made possible in a simple manner.

According to one exemplary embodiment, there is associated with the actuating element a blocking member which is configured to block the actuating element in a blocking position at the locking body in the locked state, in which blocking position the actuating element urges the locking member at least in portions toward the fastening interface of the hand-held machine tool.

The present invention thus makes it possible to provide a tool attachment in which the actuating element may be safely and reliably blocked at the locking body upon urging of the locking member.

The blocking member is preferably of a resilient configuration at least in regions and has a blocking portion which in the blocking position may be releasably fixed in a fixing member provided on the locking body.

Thus, a robust and inexpensive blocking member may be provided.

Preferably, the fixing member is configured in the manner of a recess and the blocking portion is configured to snap into the fixing member in the blocking position in order to prevent automatic rotation of the actuating element relative to the locking body in the locked state.

Thus, an operationally safe and reliable engagement of the actuating element at the locking body may be made possible.

The locking member and the blocking member are preferably constructed in one piece.

Thus, a simple and inexpensive single component may be used to implement the locking member and the blocking member.

According to one exemplary embodiment, the locking body has locking elements which are configured in the manner of bayonets to form a bayonet connection with the fastening interface of the hand-held machine tool.

The present invention thus makes it possible to provide a tool attachment that is safely and reliably connectable to the fastening interface of the hand-held machine tool by a robust and stable bayonet connection.

The object mentioned in the introduction is also attained by a hand-held machine tool having a fastening interface for fastening of a tool attachment which has a locking body which is lockable to the fastening interface. There is associated with the fastening interface a locking element which is configured to lock a rotationally secured locking of the locking body of the tool attachment to the fastening interface.

Furthermore, the object mentioned in the introduction is also attained by a tool system having a hand-held machine tool which has a fastening interface, and having a tool attachment for fastening to the fastening interface of the hand-held machine tool. The tool attachment has a locking unit which in an unlocked state makes it possible for the tool attachment to be placed on the fastening interface of the hand-held machine tool and in a locked state makes it possible for the tool attachment to be locked to the fastening interface of the hand-held machine tool for operation. The locking unit has a rotatable locking body which in the unlocked state is disposed in a first rotational position and in the locked state is disposed in a second rotational position on the fastening interface of the hand-held machine tool. The locking unit has a locking member which is configured to prevent rotation of the locking body from the second rotational position into the first rotational position in the locked state.

In addition, the object mentioned in the introduction is also attained by a hand-held machine tool having a fastening interface for rotationally secured fastening of a tool attachment, wherein the fastening interface is fastened to a gear unit housing of the hand-held machine tool.

The present invention thus makes it possible to provide a hand-held machine tool of a compact and robust construction.

Preferably, the hand-held machine tool has a tool holder for receiving an inserted tool, which tool holder has a spring-loaded locking sleeve for locking the inserted tool, wherein the locking sleeve may be pushed at least partly into the fastening interface.

Thus, it is possible to provide a hand-held machine tool of a shorter overall length.

Preferably, the fastening interface is configured to enable a fastening of the tool attachment to the gear unit housing, which fastening is oriented in a predetermined angular position.

Thus, an application-specific orientation of the tool attachment on the hand-held machine tool may be made possible in a simple manner.

Preferably, an at least partly conical centering aid is provided at the fastening interface for axial centering of the tool attachment.

Thus, a stable and reliable axial centering of the tool attachment on the hand-held machine tool may be made possible.

Preferably, there is associated with the fastening interface a locking element which is configured to lock a rotationally secured locking, to the fastening interface, of a locking body of the tool attachment, which locking body is lockable to the fastening interface.

It is thus possible for automatic detachment of the locking body of the tool attachment from the fastening interface of the hand-held machine tool in operation thereof to be safely and reliably prevented by the locking member.

Exemplary embodiments of the present invention are described in detail in the following with reference to the accompanying drawings.

BRIEF DESCRIPTION OF THE DRAWINGS

FIG. 5 shows a perspective view of the locking body of FIG. 4 with a blocking member according to one exemplary embodiment.

FIG. 6 shows a perspective view of the actuating element of FIG. 2 according to one exemplary embodiment, with the locking member of FIG. 4 and the blocking member of FIG. 5.

FIG. 7 shows a perspective view of the actuating element of FIG. 6.

FIG. 8 shows a perspective view of the actuating element of FIG. 6, without the locking member of FIG. 4.

FIG. 11 shows a sectional view of the tool system of FIG. 10 upon locking of the tool attachment to the hand-held machine tool.

FIG. 12 shows a sectional view of a tool system according to one exemplary embodiment, with the tool attachment of FIG. 2 having a locking unit configured according to an alternative exemplary embodiment, placed on the hand-held machine tool of FIG. 1.

DETAILED DESCRIPTION

Figure 1:
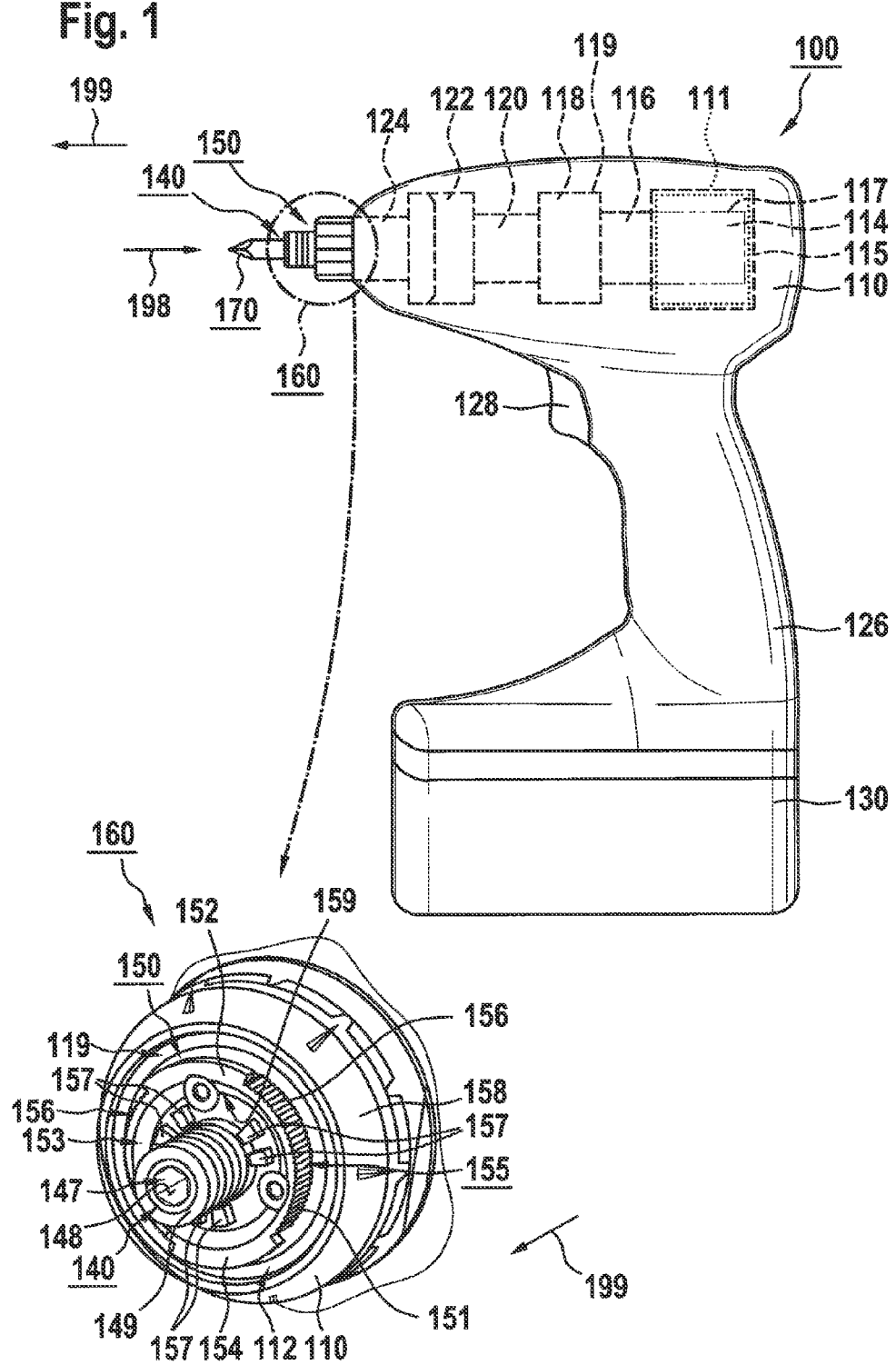
FIG. 1 shows a schematic view of a hand-held machine tool with a tool holder and a fastening interface according to one exemplary embodiment.

FIG. 1 shows a hand-held machine tool 100 provided with a tool holder 140 and having a housing 110 with a hand grip 126, and also shows an enlarged detail of hand-held machine tool 100. According to one exemplary embodiment, hand-held machine tool 100 is mechanically and electrically connectable to a battery pack 130 for mains-independent power supply.

Hand-held machine tool 100 is configured by way of example as a battery-powered rotary impact screwdriver. It is pointed out, however, that the present invention is not limited to battery-powered rotary impact screwdrivers but rather may be used in different hand-held machine tools having a tool holder corresponding to tool holder 140, irrespective of whether the hand-held machine tool is operable electrically, that is, mains-independently using battery pack 130 or mains-dependently, and/or non-electrically.

Disposed in housing 110 are an electric drive motor 114 supplied with power by battery pack 130, and a gear unit 118 and an optional impact mechanism 122. Drive motor 114 is operable, that is, may be switched on or off, by a manual switch 128, for example, and is preferably electronically controllable by closed or open loop control such that both reversing operation and settings in respect of a desired speed of rotation may be implemented.

According to one exemplary embodiment, drive motor 114 is an electronically commutated drive motor, preferably a DC motor having by way of illustration stator and rotor components 111 and 117 respectively. In this case, stator components 111 form by way of example an outer stator and rotor components 117 form by way of example an inner rotor. It is pointed out, however, that the description of a drive motor constructed in the manner of an electronically commutated drive motor with outer stator and inner rotor is purely of an illustrative nature and is not to be construed as a limitation of the present invention which may also be used in the case of a drive motor having an inner stator and an outer rotor or, for example, in the case of a commutator motor having brushes.

Drive motor 114 is connected via an associated motor shaft 116 to gear unit 118 which converts rotation of motor shaft 116 into rotation of a drive member 120, for example a drive shaft, provided between gear unit 118 and impact mechanism 122. That conversion preferably takes place such that drive member 120 rotates relative to motor shaft 116 with an increased torque but at a reduced speed of rotation. By way of illustration, drive motor 114 is disposed in a motor housing 115 and gear unit 118 is disposed in a gear unit housing 119, gear unit housing 119 and motor housing 115 being disposed by way of example in housing 110.

Optional impact mechanism 122 which is connected to drive member 120 is by way of example a rotary impact mechanism which produces high-intensity impact-like rotary pulses and transmits them to a drive shaft 124, for example a drive spindle. An example of an impact mechanism with which impact mechanism 122 may be implemented is described in German Utility Model DE 20 2006 014 850 U1 to which reference is explicitly made here and the teachings of which are incorporated herein by reference and are to be understood as forming part of the present description, so that a detailed description of impact mechanism 122 may be dispensed with here for conciseness.

Constructed at drive shaft 124 is tool holder 140 which by way of illustration has a receiving body 147 with internal polygonal receptacle 148 which is provided to receive inserted tools with external polygonal couplings. On the outer periphery of receiving body 147, which is rotationally rigidly connected and/or integrally connected, for example, to drive shaft 124, there is disposed by way of example a locking sleeve 149 for locking suitable inserted tools in internal polygonal receptacle 148, which locking sleeve 149 is spring-loaded by a spring element in an axial direction 199 pointing away from hand-held machine tool 100.

Tool holder 140 is constructed by way of example in the manner of a bit holder, that is, for receiving an inserted tool 170 which is constructed in the manner of a screwdriver bit and which is pushed into internal polygonal receptacle 148 in the direction of hand-held machine tool 100 as indicated by an arrow 198. A screwdriver bit of that kind, which, for example, is of the so-called HEX type, is sufficiently known from the related art and therefore a detailed description will be dispensed with here for conciseness. It is pointed out, however, that the present invention is not limited to use of a HEX screwdriver bit, but rather other inserted tools may also be used depending on a respectively selected configuration of tool holder 140, for example HEX drills or so-called SDS Quick insert tools. It is furthermore pointed out that the structure and mode of operation of a suitable bit holder will also be sufficiently known to a person skilled in the art and therefore a detailed description of bit holder 140 may be dispensed with here for conciseness.

According to one exemplary embodiment, there is associated with hand-held machine tool 100 a fastening interface 150 which by way of illustration is fastened to housing 110 in an axially and radially immovable manner in the region of bit holder 140 and which is referred to hereinafter for clarity of the description as "machine interface 150". It is pointed out, however, that machine interface 150 is constructed as a separate component merely by way of example and may alternatively be constructed in one piece with housing 110.

Machine interface 150 serves to fasten an associated tool attachment (200 in FIG. 2) in a rotationally secured manner, which tool attachment may, for example, be constructed in the manner of a drill chuck, an angle attachment or an eccentric attachment. By way of illustration, machine interface 150 has a fastening element 151 which is fastened to a front face 112 of housing 110 in a rotationally secured manner. Fastening element 151 is by way of example at least partly sleeve-shaped or ring-shaped, and is fastened in the region of a terminating or protective sleeve 158 disposed annularly on housing 110 at front face 112 by suitable fastening members, for example screws or rivets, but may alternatively be constructed in one piece with housing 110. Fastening element 151 preferably at least partly surrounds bit holder 140 at a predetermined radial spacing in order to allow axial displacement of locking sleeve 149 of bit holder 140 in the interior of fastening element 151.

According to one exemplary embodiment, fastening element 151 has at its outer periphery at least one locking element 155 and at least two retaining members 152, 154. Locking element 155 preferably has at least one set of locking teeth 156 and the at least two retaining members 152, 154 are constructed by way of example in the manner of bayonets to form a bayonet connection. It is pointed out, however, that the description of such a bayonet connection is merely of an illustrative nature and does not serve to limit the present invention. Rather, alternative fastening possibilities may also be used in the case of machine interface 150, in which a corresponding tool attachment (200 in FIG. 2) may be fastened to machine interface 150 by a rotational movement, for example a so-called wire bail latch, etc.

By way of illustration, there is provided at machine interface 150 an at least partly conical centering aid 153 for axial centering of a locking unit (202 in FIG. 2) of an associated tool attachment (200 in FIG. 2), fastening element 151 being configured to enable the associated tool attachment (200 in FIG. 2) to be axially centered at housing 110. For that purpose, there is provided on the inner periphery of fastening element 151 a centering surface 159, which by way of example is annular and at least partly funnel-shaped, to form centering aid 153.

It is pointed out, however, that centering surface 159 is funnel-shaped only by way of example and not as a limitation of the present invention. Rather, it is also possible to implement a cone-shaped configuration at an additional centering ring. Accordingly, any reference to the term "conical" in the context of the present invention represents a reference both to a cone-shaped and to a funnel-shaped configuration of a corresponding component. Furthermore, instead of having a single annular and funnel-shaped centering surface 159, centering aid 153 may also have a plurality of conical arc portions, etc.

In addition, fastening element 151 has at least one and by way of example three optional angle setting members 157. These are used, for example in the case of a tool attachment constructed in the manner of an angle attachment or eccentric attachment being fastened to machine interface 150, to specify a predetermined angular position.

Figure 2:
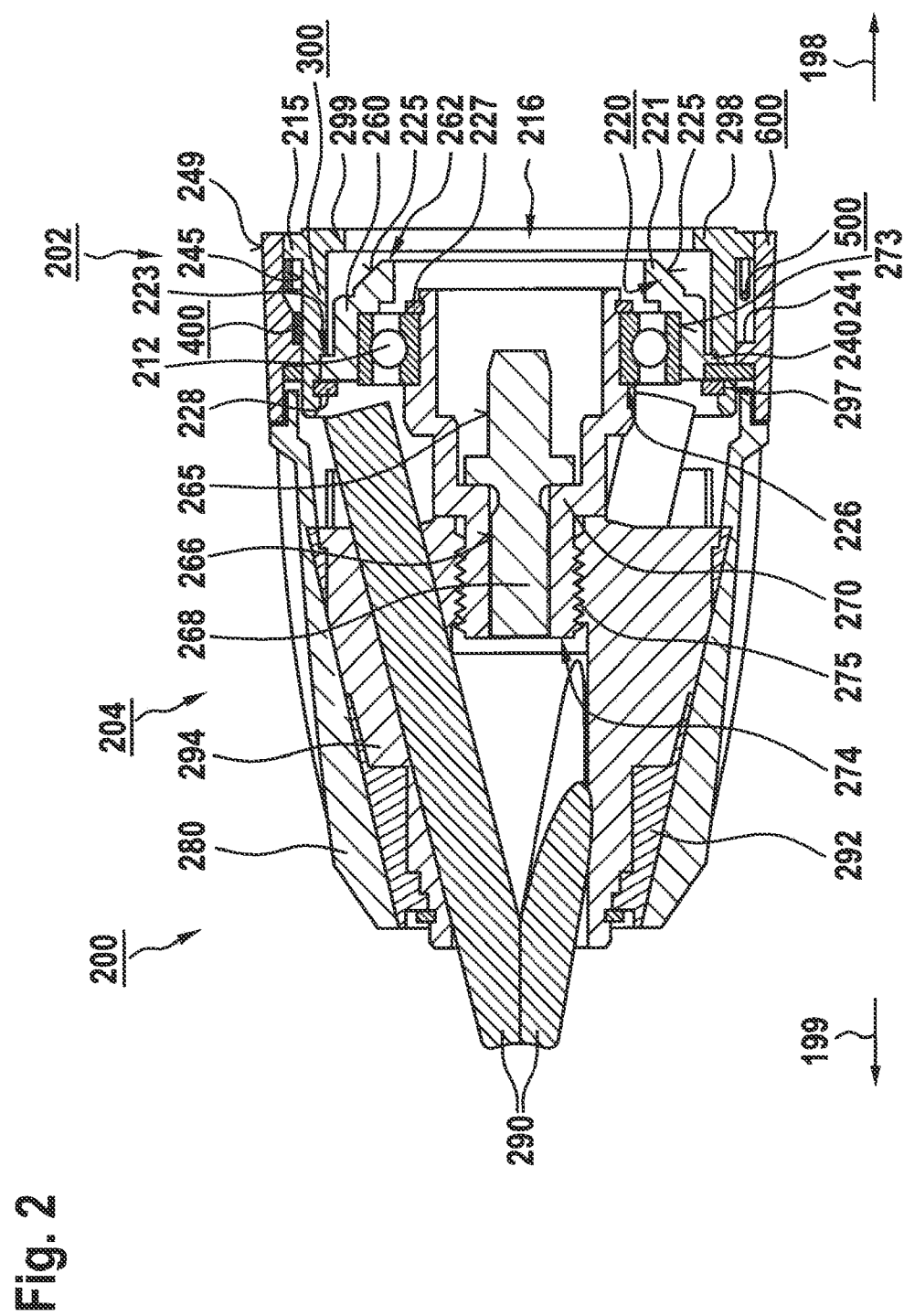
FIG. 2 shows a sectional view of a tool attachment that may be fastened to the fastening interface of the hand-held machine tool of FIG. 1, having a locking body and an actuating element according to one exemplary embodiment.

FIG. 2 shows an example of a tool attachment 200 which may be fastened to machine interface 150 of hand-held machine tool 100 of FIG. 1 in a rotationally secured manner. Tool attachment 200 is constructed, according to one exemplary embodiment, in the manner of a drill chuck attachment and has by way of example a locking unit 202 and a clamping chuck unit 204. It is pointed out, however, that tool attachment 200 is constructed as a drill chuck attachment only by way of example and not as a limitation of the present invention. Rather, tool attachment 200 may be of any desired configuration, for example in the manner of an angle attachment, an eccentric attachment etc.

Clamping chuck unit 204 has by way of example a supporting body 294 on which there is supported a plurality of clamping jaws 290 which are operable by a clamping body 292 provided with a clamping sleeve 280 to clamp therein an associated inserted tool, for example a round drill. Supporting body 294 is fastened in a rotationally secured manner, for example by a screwed connection 275, to a first axial end 274 of an actuating member 270 associated with locking unit 202, so that, upon rotational movement of actuating member 270, supporting body 294 rotates therewith. Alternatively, supporting body 294 may, for example, also be connected to actuating member 270 by way of a press-fit connection or may also be constructed in one piece therewith. By way of illustration, in at least partly sleeve-shaped actuating member 270, a drive shaft 268 is received in a rotationally secured manner, for example by a press-fit connection 266, so that, upon rotation of drive shaft 268, actuating member 270 rotates therewith. Alternatively, drive shaft 268 and actuating member 270 may also be constructed in one piece.

At a free axial end of drive shaft 268, which by way of example is received in a second axial end region of actuating member 270, a polygonal driving contour 265 is provided. An outer periphery of the second axial end region of actuating member 270 is rotatably supported in, and preferably press-fitted in, a bearing element 212 associated with locking unit 202, for example a rolling bearing constructed in the manner of a radial bearing, so that clamping chuck unit 204 is rotatably supported at locking unit 202. Bearing element 212 is in this case axially fixed in position in the axial direction of actuating member 270 between an annular shoulder 226 formed thereon and a securing ring 227 fastened thereto. It is pointed out, however, that a suitable practical realization of clamping chuck unit 204 is sufficiently known from the related art and therefore a detailed description of clamping chuck unit 204 may be dispensed with here for conciseness.

According to one exemplary embodiment, locking unit 202 is configured at least for rotationally secured fastening to machine interface 150 of hand-held machine tool 100 of FIG. 1 and, in an unlocked state, makes it possible for tool attachment 200 to be placed on machine interface 150 and, in a locked state, makes it possible for tool attachment 200 to be locked to machine interface 150 for operation. For that purpose, locking unit 202 preferably has a rotatable locking body 300 which in the unlocked state is disposed in a first rotational position and in the locked state is disposed in a second rotational position on machine interface 150 of hand-held machine tool 100 of FIG. 1, as described hereinafter in the case of FIGS. 10 and 11. That locking body 300 preferably has at its inner periphery at least two retaining members 298, 299 which are configured, for example, in the manner of bayonets to form a bayonet connection with bayonets 152, 154 of machine interface 150 of FIG. 1.

According to one exemplary embodiment, locking body 300 is at least partly tubular and forms an interior space 216 and also an outer periphery 245 on which an external collar 215 is provided. External collar 215 is provided at an axial end (399 in FIG. 3) of locking body 300, which axial end is remote from clamping jaw unit 204, locking body 300 having at its opposite axial end (398 in FIG. 3) an internal annular groove 297 with an internal securing ring 228 being fastened in annular groove 297. In addition, by way of illustration, locking body 300 has an internal annular shoulder 223, a centering member 260 being by way of example axially fixed in position in the region between annular shoulder 223 and securing ring 228. Between that centering member 260 and annular shoulder 223, an elastic element 240 is preferably disposed, for example an O-ring of rubber material, a cup spring, a corrugated washer, a cylindrical compression spring etc. By way of example, bearing element 212 is disposed at inner periphery 273 of centering member 260 and is preferably press-fitted therein.

Preferably, a preferably sleeve-shaped actuating element 600 provided with an external grip surface 249 and having an internal projection 241, which by way of illustration is annular, is disposed and rotatably supported on outer periphery 245 of locking member 300. Actuating element 600 is configured to make it possible for locking body 300 to be rotated from the first into the second rotational position.

In the region between locking body 300 and actuating element 600, according to one exemplary embodiment a locking member 400 that is resilient at least in regions and a blocking member 500 are disposed. Locking member 400 is fixed in position on locking body 300 at least by a portion, and blocking member 500 on actuating element 600. According to one exemplary embodiment, locking member 400 is configured to prevent rotation of locking body 300 from its second rotational position into its first rotational position in the locked state of locking unit 202, locking member 400 preferably cooperating with locking element 155 of FIG. 1 associated with machine interface 150 of hand-held machine tool 100 of FIG. 1. In this case, actuating element 600 is preferably configured to urge locking member 400 in the locked state of locking unit 202 at least in portions toward machine interface 150 of hand-held machine tool 100, as described below in the case of FIG. 11. Blocking member 500 is configured according to one exemplary embodiment to block actuating element 600, in the locked state of locking unit 202, in a blocking position at locking body 300, in which position actuating element 600 urges locking member 400 at least in portions toward machine interface 150 of hand-held machine tool 100 of FIG. 1 to prevent automatic rotation of actuating element 600 relative to locking body 300.

It is pointed out, however, that locking member 400 described above and blocking member 500, which is separate therefrom, are merely of an illustrative nature and do not serve to limit the present invention. Rather, locking member and blocking member may also be constructed in one piece and, for example, may together be held on the locking body, as will be described by way of example below in the case of FIG. 12. Furthermore, it is also pointed out that the described tubular or sleeve-shaped configurations of locking body 300 and of actuating element 600 are likewise merely of an illustrative nature and are not to be construed as a limitation of the present invention. Rather, locking body 300 and the actuating element may, for example, each be formed from two or more arcuate elements, etc.

Centering member 260 and machine interface 150 of hand-held machine tool 100 of FIG. 1 preferably form complementary geometric shapes which make possible an axial centering of locking unit 202 at machine interface 150 of FIG. 1 and for that purpose they preferably engage with each other. Those complementary geometric shapes are configured to form a positive connection in the axial direction of locking unit 202. For that reason, complementary geometric shapes are to be understood within the context of the present invention as being quite generally geometric shapes that are capable of being joined together to form a positive connection.

By way of illustration, centering member 260 of locking unit 202 has at least one at least partly conical centering aid 220. Centering aid 220 is provided for engagement in at least partly funnel-shaped centering aid 153 provided at machine interface 150 of hand-held machine tool 100 of FIG. 1, and is preferably configured at least partly in the manner of a ring 221 having an outer periphery 225 that is chamfered at least in regions, at an axial end region 262 of locking unit 202. Alternatively, instead of having ring 221, centering aid 220 may have, for example, a plurality of conical arc portions, etc.

For mounting of tool attachment 200 on machine interface 150 of hand-held machine tool 100 of FIG. 1, tool attachment 200 is brought in direction 198 of FIG. 1 toward machine interface 150 and is positioned thereon such that actuating member 270 is brought into contact with locking sleeve 149 of tool holder 140 of hand-held machine tool 100, so that the free end of drive shaft 268 at least partly engages the empty internal polygonal receptacle 148 of tool holder 140. Then, tool attachment 200 is moved toward machine interface 150 in direction 198, in which operation actuating member 270 also moves locking sleeve 149 in direction 198 and thus unlocks tool holder 140 so that the free end of drive shaft 268 is pushed into internal polygonal receptacle 148. In that operation, tool attachment 200 is pushed onto machine interface 150 such that locking body 300 rests against, or rather engages around, fastening element 151 of machine interface 150 of FIG. 1 so that, by actuation of actuating element 600, locking unit 202 may be locked to machine interface 150 of FIG. 1. In that operation, at least partly conical centering aid 220 of locking unit 202 is brought into contact with at least partly funnel-shaped centering aid 153 of machine interface 150 of FIG. 1. To take tool attachment 200 off hand-held machine tool 100 of FIG. 1, it is removed from machine interface 150 of FIG. 1 in direction 199 of FIG. 1 after locking unit 202 has been unlocked.

It is, however, once again pointed out that centering aids 220 and 153 of FIG. 1 are of a conical configuration merely by way of example and not as a limitation of the present invention. Rather, as described above, they merely have to have complementary geometric shapes suitable for forming a positive connection. Accordingly, centering aid 153 of machine interface 150 may, for example, as shown in FIG. 1, be funnel-shaped while centering aid 220 of tool attachment 200 is, for example, cylindrical or annular. Alternatively, it is possible, for example, for centering aid 220 of tool attachment 200 to be of a conical, that is, cone-shaped or funnel-shaped, configuration as described above, while centering aid 153 of machine interface 150 of FIG. 1 is cylindrical or annular, and so on.

Figure 3:
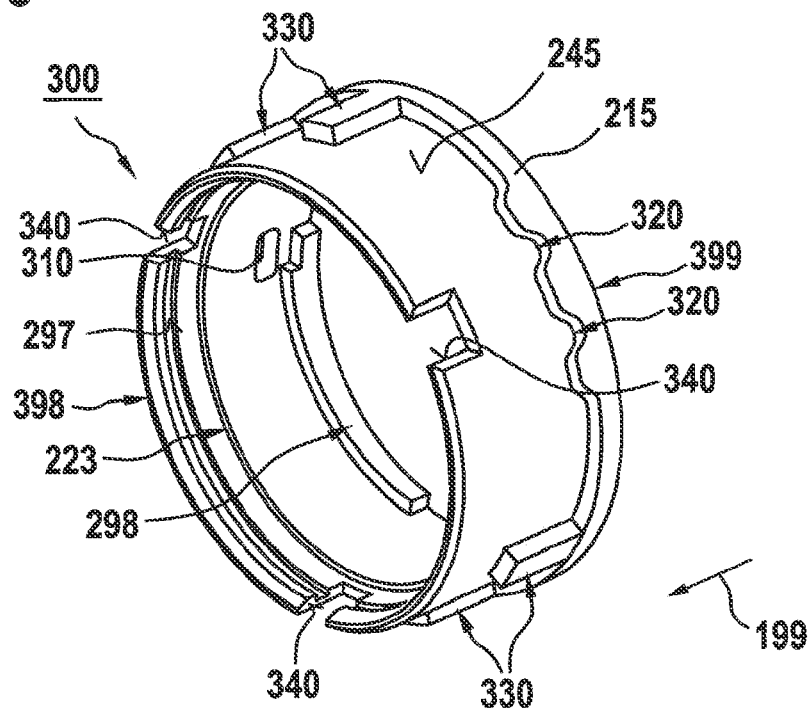
FIG. 3 shows a perspective view of the locking body of FIG. 2.

FIG. 3 shows tubular locking body 300 of FIG. 2 which at an axial end 399 has on its outer periphery 245 external collar 215 and on its inner periphery retaining member 298 constructed in the manner of a bayonet. At its opposite axial end 398, internal annular groove 297 and internal annular shoulder 223 are provided. In addition, at axial end 398, by way of example three openings 340 for receiving associated retaining members of centering member 260 of FIG. 2 are provided which, for example, are oriented radially outwardly from centering member 260 in the manner of projections.

According to one exemplary embodiment, at least one driven member 330 is provided on locking body 300, by way of illustration at outer periphery 245 thereof. Driven member 330 is by way of example of a ridge-like configuration and, beginning at external collar 215, is oriented, for example, parallel to the axis of rotation of locking body 300 in the direction of axial end 398, as indicated by arrow 199 of FIG. 2. In addition, by way of illustration a fixing member 320 is provided on external collar 215. Furthermore, an engagement aperture 310 is provided in the region of external collar 215.

Figure 4:
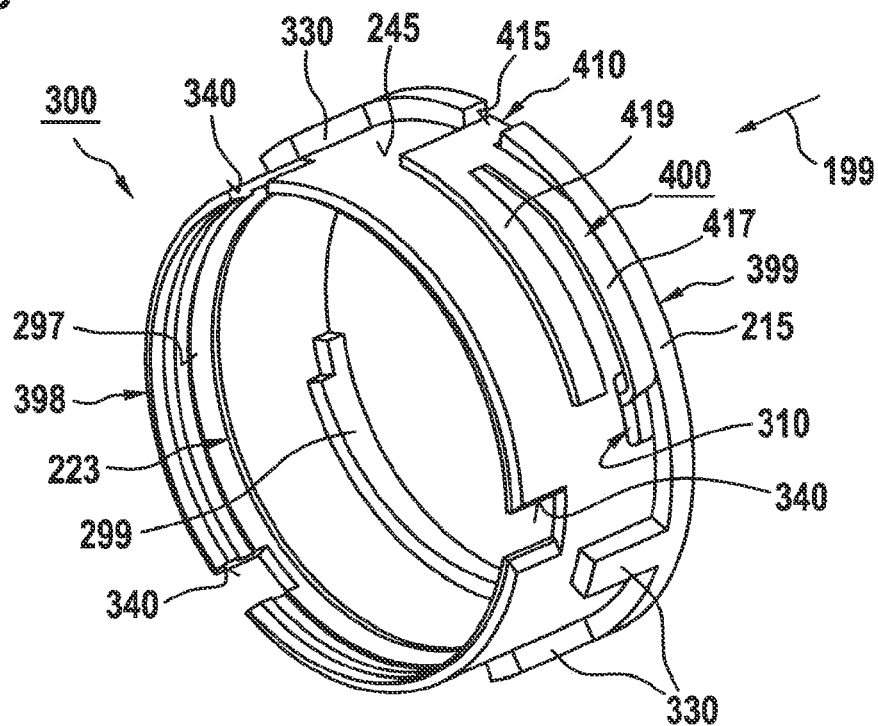
FIG. 4 shows a perspective view of the locking body of FIG. 3 with a locking member according to one exemplary embodiment.

FIG. 4 shows locking body 300 of FIG. 3 rotated about its axis of rotation by about 180°. In contrast to FIG. 3, as a result of the rotation, retaining member 299 configured in the manner of a bayonet at axial end 399 is visible here.

According to one exemplary embodiment, locking member 400 of FIG. 2 is fastened to outer periphery 245 of locking body 300. For that purpose, locking member 400 has a fastening portion 410 which by way of example is fastened in a groove-like opening 415 of external collar 215 of locking body 300. Beginning at that fastening portion 410, locking member 400 is by way of illustration U-shaped with a locking spring arm 417 extending, at least in regions, parallel to external collar 215 and with a supporting arm 419 extending, for example, parallel to arm 417. Locking spring arm 417 engages by its free end through engagement aperture 310 of locking body 300. Supporting arm 419 preferably rests completely against outer periphery 245 of locking body 300.

FIG. 5 shows locking body 300 of FIG. 4 mirrored in the direction of arrow 199 of FIGS. 3 and 4 to illustrate the free end, engaging through engagement aperture 310 thereof, of locking spring arm 417 of locking member 400 of FIG. 4, which locking member 400 according to one exemplary embodiment forms a locking portion 420. In addition, FIG. 5 shows blocking member 500 of FIG. 2 which is disposed by way of illustration on outer periphery 245 of locking body 300 and which, as described in the case of FIG. 2 and as shown in FIG. 6, is fastened to actuating element 600 of FIG. 2 and has by way of example the shape of a curly brace.

Blocking member 500 is preferably configured to be resilient at least in regions and has a blocking portion 520 which may be releasably fixed to fixing member 320 provided on external collar 215 of locking body 300. In this case, fixing member 320 has at least one snap-in groove configured in the manner of a recess into which blocking portion 520, which by way of illustration is configured in the manner of a resilient snap-in projection, may be snapped.

FIG. 6 shows sleeve-shaped actuating element 600 of FIG. 2 with locking member 400 of FIGS. 4 and 5 disposed on its inner periphery to illustrate fastening portion 410 of FIG. 4 and locking portion 420 of FIG. 5. Actuating element 600 may have at its outer periphery 249 a grip surface that is rubberized at least in regions and which enables actuating element 600 to be actuated comfortably and safely.

According to one exemplary embodiment, at least one driver element 630 is provided on the inner periphery of actuating element 600. Driver element 630 is by way of example of a ridge-like configuration and, beginning at internal projection 241, is oriented, for example, parallel to the axis of rotation of actuating element 600 in the direction of the axial end of actuating element 600 remote from projection 241, that is to say, in FIG. 2 in the direction of arrow 198. In addition, in the region of internal projection 241, a fastening member 620 is disposed for fastening of blocking member 500 of FIGS. 2 and 5. By way of illustration, fastening member 620 has two openings in which the free ends of blocking member 500, which is configured in the manner of a curly brace, are disposed. The free ends may be permanently fastened in the two openings in any desired manner.

FIG. 7 shows actuating element 600 of FIG. 6 tilted about its axis of rotation, with locking member 400 of FIG. 4 disposed on its inner periphery and with a control curve 650, constructed on the inner periphery according to one exemplary embodiment, for actuating locking member 400 or rather locking spring arm 417 thereof. Control curve 650 is preferably configured to make it possible for locking member 400 to be urged at least in portions toward machine interface 150 of hand-held machine tool 100 of FIG. 1 in the locked state of locking unit 202 of FIG. 2.

FIG. 8 shows actuating element 600 of FIG. 6 rotated about its axis of rotation by about 160°, without locking member 400 of FIGS. 4 and 5, to illustrate control curve 650 of FIG. 7. According to one exemplary embodiment, control curve 650 has a release portion 652, in which locking spring arm 417 of locking member 400 is able to spring radially outward in a release position, and an urging portion 656, configured by way of illustration in the manner of a radially inwardly oriented projection, with which locking spring arm 417 may be urged radially inward in a locking position. Between release portion 652 and urging portion 656, a sloped transfer portion 654 is preferably provided over which it is possible for locking spring arm 417 to be transferred from its release position to its locking position and vice versa.

Figure 9:
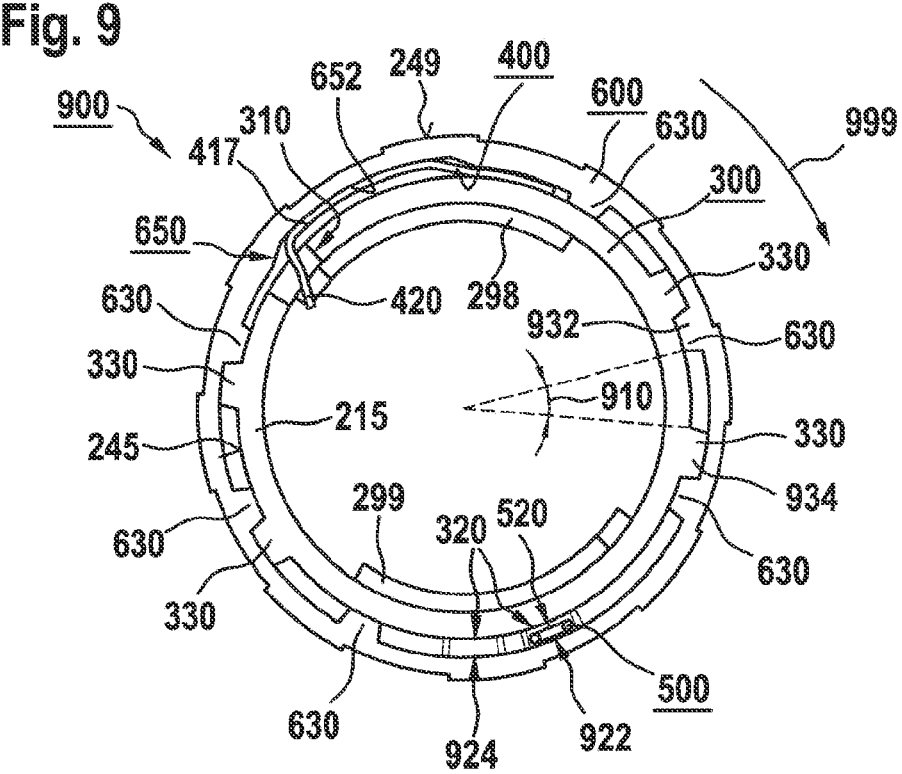
FIG. 9 shows a sectional view of the actuating element of FIG. 2 supported on the locking body of FIG. 2.

FIG. 9 shows an assembly 900 having locking body 300 of FIGS. 3 through 5 and actuating element 600 of FIGS. 6 through 8 rotatably supported on its outer periphery 245, and locking and blocking members 400 and 500, respectively, of FIGS. 4 through 6 disposed therebetween. Locking body 300 and actuating element 600 are shown by way of example in the unlocked state of locking unit 202 of FIG. 2, in which blocking portion 520 of blocking member 500 is engaged in an unlocking position in a first recess 922 of fixing member 320 and locking spring arm 417 of locking member 400 springs radially outward in its release position toward release portion 652 of control curve 650.

According to one exemplary embodiment, locking body 300 may be rotated by rotation of actuating element 600 in the direction of an arrow 999—clockwise in FIG. 9—in order to transfer locking unit 202 of FIG. 2 from the unlocked to the locked state. In this case, driven members 330 of locking body 300 are preferably configured to make possible a rotational movement of actuating element 600 relative to locking body 300 at least by a predetermined rotation angle 910 to enable blocking member 500 to be transferred from the unlocked position to the blocking position, in which its blocking portion 520 snaps into a second recess 924 of fixing member 320, and to enable locking member 400 to be transferred from its release position to its locking position.

After such a relative rotation by rotation angle 910, viewed in the direction of arrow 999 driver elements 630 rest against driven members 330. For example, after the relative rotation by rotation angle 910, a driver element 932 rests against a driven member 934. Upon rotation in the direction of arrow 999 beyond rotation angle 910, driver elements 630 of actuating element 600 and driven members 330 of locking body 300, which viewed in the direction of arrow 999 now rest against each other, are preferably configured to cooperate for rotary entrainment of locking body 300 in order to rotate locking body 300 from its first rotational position to its second rotational position.

Figure 10:
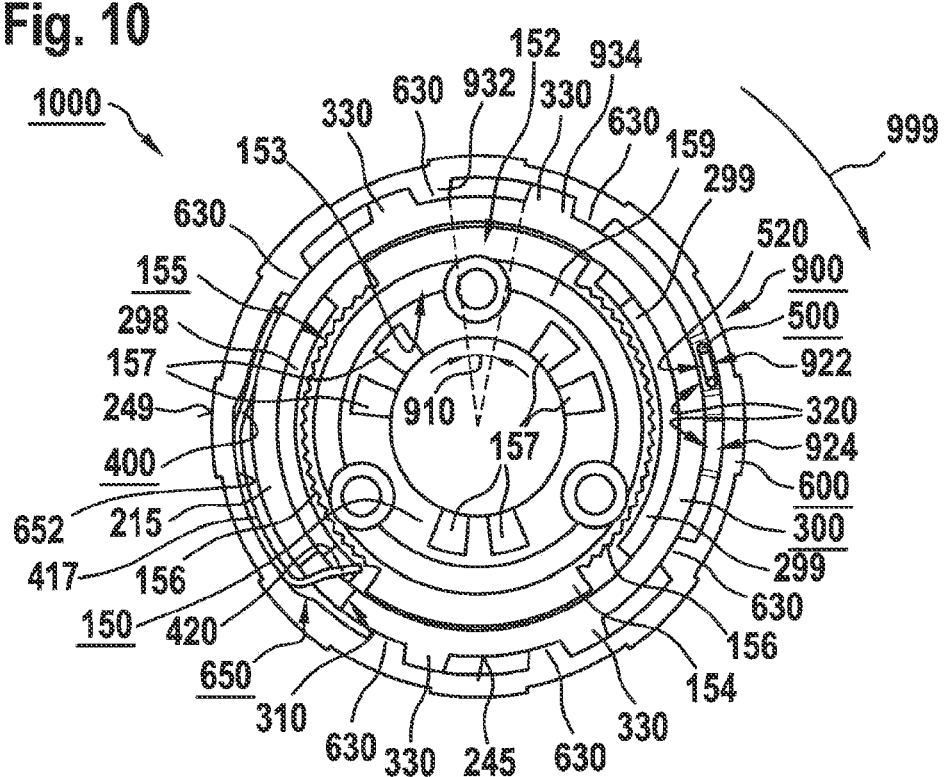
FIG. 10 shows a sectional view of a tool system according to one exemplary embodiment, with the tool attachment of FIG. 2 placed on the hand-held machine tool of FIG. 1.

FIG. 10 shows a tool system 1000 with hand-held machine tool 100 of FIG. 1 and tool attachment 200 of FIG. 2, of which only machine interface 150 of FIG. 1 and assembly 900 of FIG. 9 are shown in order to simplify the drawing. For releasable fastening or locking of tool attachment 200, assembly 900 is disposed on machine interface 150 such that bayonets 298, 299 and 152, 154 of locking body 300 and machine interface 150 may be locked to each other by rotation of actuating element 600 in direction 999 of FIG. 9, and hence of locking body 300 from its illustrated, first rotational position to its second rotational position illustrated in FIG. 11.

When such a rotation is performed by a user of tool system 1000, bayonets 298, 299 and 152, 154 are first brought into engagement with one another such that, owing to elastic element 240 of FIG. 2, a resilient force is built up between bayonets 298 and 152 and, respectively, 299 and 154, which force is greater than the spring forces of blocking portion 520 of blocking member 500, which blocking portion 520 is to be transferred between recesses 922 and 924, and of locking spring arm 417 of locking member 400, which arm 417 is to be guided along sloped transfer portion 654 of control curve 650. Accordingly, upon further rotation of actuating element 600 in direction 999, first the relative rotation described in the case of FIG. 9 between actuating element 600 and locking body 300 by rotation angle 910 takes place, in which rotation a rotation of locking body 300 is prevented by the resilient force that has built up. After completion of the relative rotation by rotation angle 910, locking portion 420 of locking member 400 engages set of locking teeth 156 of locking element 155 and the resilient force which has built up may be overcome by a rotational force applied by the user in order to close the bayonet connection completely.

Since, therefore, locking portion 420 of locking member 400 already engages set of locking teeth 156 of locking element 155 upon tightening and at least upon complete closing of the bayonet connection, a chattering or clattering noise is produced which provides the user with auditory feedback. That noise preferably does not occur upon undoing the bayonet connection since in that case, owing to the resilient force which has built up, the connection forces are preferably greater than the above-described spring forces, with the result that the engagement of locking portion 420 by set of locking teeth 156 is released before bayonet connection is undone.

FIG. 11 shows tool system 1000 of FIG. 10 in the locked state of locking unit 202 of FIG. 2 after rotation of actuating element 600 in the direction of arrow 999 and hence of locking body 300 into its second rotational position. FIG. 11 makes clear the arrangement of blocking portion 520 of blocking member 500, which blocking portion 520 is disposed in the blocking position in recess 924 of fixing member 320, and also illustrates locking member 400 urged by elastic deformation toward machine interface 150 of hand-held machine tool 100 and whose locking portion 420 engages set of locking teeth 156 in order to prevent locking body 300 from automatically turning from its second rotational position into the first rotational position of FIGS. 9 and 10. In addition, FIG. 11 illustrates locking spring arm 417 which is urged radially inward by urging portion 656 of control curve 650.

FIG. 12 shows a tool system 1200 with hand-held machine tool 100 of FIG. 1, of which only machine interface 150 is shown to simplify the drawing, and tool attachment 200 of FIG. 2 which has a locking body 300', an actuating element 600' and a locking and blocking member 400' that are configured in accordance with an alternative exemplary embodiment. Elements in the two exemplary embodiments that are functionally identical but which structurally may have been slightly modified have identical reference numerals.

In contrast to locking member 400 of FIG. 4 and blocking member 500 of FIG. 5, locking and blocking member 400' is in one piece with a locking portion 420' and is disposed on the inner periphery of locking body 300'. Such a one-piece configuration of locking and blocking member 400' requires a few structural alterations to locking body 300' and actuating element 600' in contrast to locking body 300 of FIGS. 3 through 5 and actuating element 600 of FIGS. 5 through 8. For example, illustrative locking and blocking member 400' merely has a locking member portion 417' and a blocking member portion 520' which assume the functionality of locking spring arm 417 and blocking portion 520, respectively, of FIGS. 4 and 5. Those portions 417', 520' engage through respective engagement apertures 310' and 310" provided at locking body 300' and are spring-loaded toward an inner periphery of actuating element 600' on which by way of illustration a control curve 650' and a fixing member 320' are provided.

Figure 13:
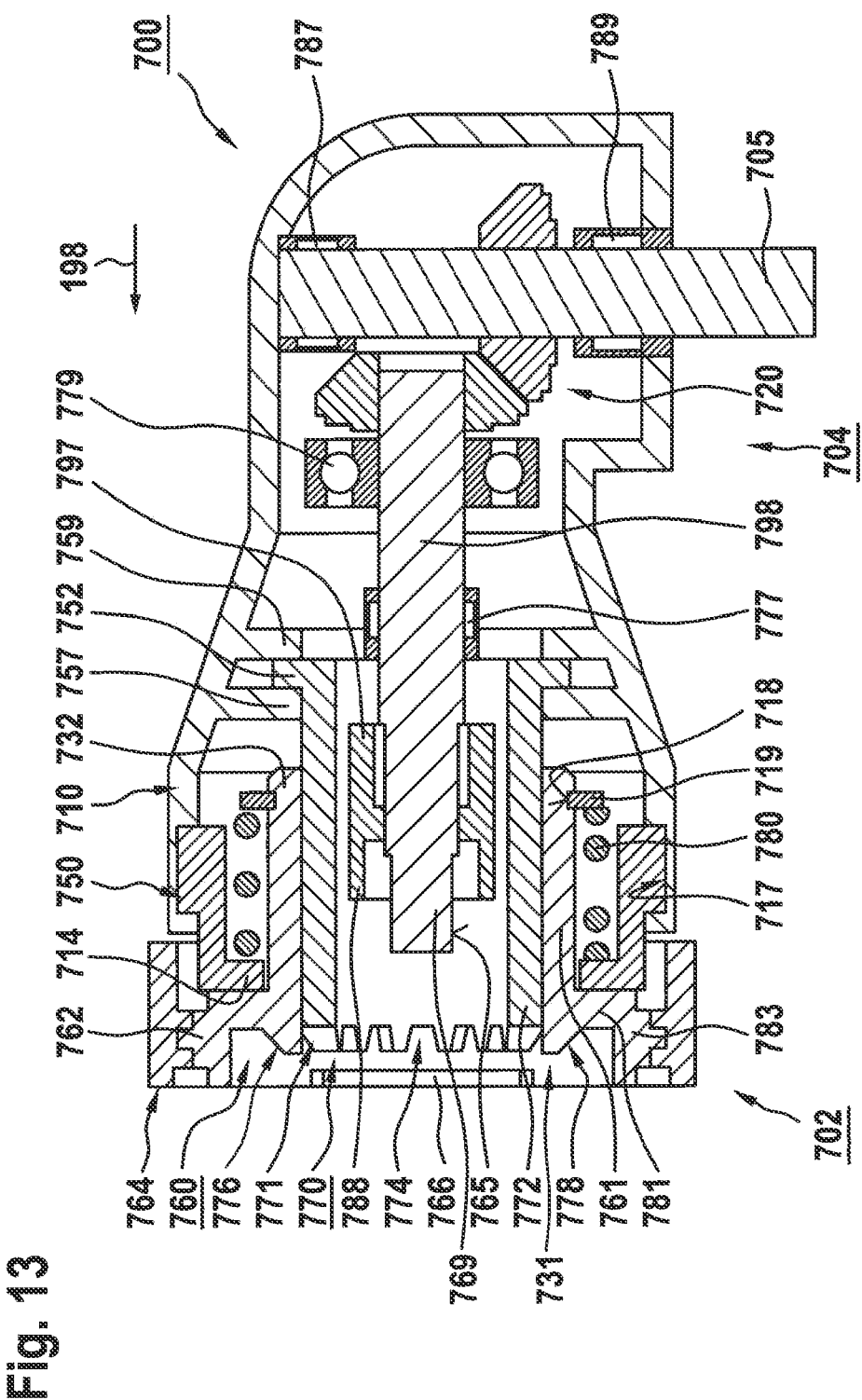
FIG. 13 shows a sectional view of a tool attachment according to an alternative exemplary embodiment, with a fastening interface for fastening to the hand-held machine tool of FIG. 1.

FIG. 13 shows an example of a tool attachment 700 according to an alternative exemplary embodiment which is preferably likewise configured for fastening to machine interface 150 of hand-held machine tool 100 of FIG. 1. Tool attachment 700 is configured in the manner of an angle attachment and by way of example has a fastening interface 702, hereinafter referred to as an "attachment interface" for clarity of the description, and a drive unit 704 which is also referred to hereinafter as an "angle drive portion". It is pointed out, however, that tool attachment 700 is constructed as an angle attachment merely by way of example and not as a limitation of the present invention. Rather, tool attachment 700 may have any desired configuration, for example in the manner of an eccentric attachment, a drill chuck attachment, etc. For simplicity of the description, tool attachment 700 is also referred to hereinafter as "angle attachment 700".

Angle drive portion 704 has by way of example an attachment housing 710 in which a drive shaft 798 which is drivable in rotation is rotatably supported in two bearing elements 777, 779. Drive shaft 798 serves to drive a drive shaft 705 which is disposed at a predetermined angle thereto, by way of illustration 90°, and which is likewise rotatably supported in attachment housing 710, for example in two bearing elements 787, 789, and which may, for example, be configured to receive screwdriver bit 170 of FIG. 1. In this case, drive shaft 798 drives drive shaft 705, for example, via a suitable conversion 720. It is pointed out, however, that a suitable practical realization of angle drive portion 704 is sufficiently known from the related art and therefore a detailed description of angle drive portion 704 may be dispensed with here for conciseness.

Disposed in the region of a free end 769, remote from angle drive portion 704, of drive shaft 798, on which end a polygonal driving contour 765 is provided by way of example, there is an angle setting element 772 which is of a sleeve-shaped or tubular configuration at least in regions, through which drive shaft 798 extends. That angle setting element 772 is preferably rigidly connected to attachment housing 710, that is, so as to be axially and radially immovable, and/or is constructed in one piece with attachment housing 710. By way of illustration, angle setting element 772 has at the axial end thereof toward angle drive portion 704 an external ring collar 752 which is disposed in an axially and radially immovable manner between two, for example annular, projections 757, 759 of attachment housing 710, for example by being press-fitted or clamped. At its other axial end 771, a front-face set of angle setting teeth 774 is provided.

In addition, drive shaft 798 is assigned an actuating member 797 which is provided with a free end 788 and the functionality of which corresponds to the functionality of actuating member 270 of FIG. 2, and therefore a detailed description thereof will be dispensed with here for conciseness description. Alternatively, drive shaft 798 and actuating member 797 may also be constructed in one piece. Actuating member 797 is by way of example disposed in the interior of angle setting element 772 and is preferably radially spaced therefrom.

According to one exemplary embodiment, drive shaft 798 is rotatable relative to actuating member 797. In this case, drive shaft 798 may, for example, be rotatably supported in a plain bearing, for example a sintered bearing, press-fitted in actuating member 797.

Fastening interface 702 serves to fasten tool attachment 700 to an associated hand-held machine tool, for example hand-held machine tool 100 of FIG. 1, and has by way of illustration an angular position setting unit 770, which may likewise be used in the case of tool attachment 200 of FIG. 2 and with which angle setting element 772 is associated, and a locking unit 760. Locking unit 760 is configured to lock tool attachment 700 for operation to the hand-held machine tool in a predetermined angular position thereon in the locked state and to enable tool attachment 700 to be pulled off the hand-held machine tool in an unlocked state. Angular position setting unit 770 is configured to enable the predetermined angular position of tool attachment 700 to be set for operation on the hand-held machine tool. According to one exemplary embodiment, angular position setting unit 770 is operable in the locked state of locking unit 760 to make it possible for the predetermined angular position to be altered. Such operation to alter the predetermined angular position is preferably effected by a combined longitudinal and rotational movement of attachment housing 710.

According to one exemplary embodiment, locking unit 760 has a locking body 762, especially a locking body of an at least partly tubular configuration or a locking body provided with a tubular receiving portion 761. In tubular receiving portion 761 and hence in locking unit 760, angle setting element is supported to be movable longitudinally and in rotation. At an axial end of locking body 762 remote from angle drive portion 704, locking body 762 continues via an annular shoulder 781 from tubular receiving portion 761 on the one hand into a widened region 783 and on the other hand into a centering member 731 which has, for example, at least two arcuate centering regions 776, 778 which are sloped in the longitudinal direction of tool attachment 700, that is, in direction 198 of FIG. 1. It is pointed out, however, that centering member 731 has the at least two arcuate, sloped centering regions 776, 778 merely by way of example and not as a limitation of the present invention. Rather, centering member 731 may also have a single centering region configured in the manner of a conical frustum.

In widened region 783, at least two locking elements 766 (and 768 in FIG. 14) are preferably provided which by way of example are configured in the manner of bayonets to form a bayonet connection. Furthermore, there is disposed on the outer periphery of that widened region 783 by way of example an actuating ring 764 which is operable to lock locking body 762 to the hand-held machine tool, it being possible for locking body 762 and actuating ring 764 to be constructed in one piece. On outer periphery of tubular receiving portion 761, by way of illustration a return sleeve 750 is supported to be movable axially and radially. The latter is supported on annular shoulder 781 by an annular collar 714 provided at an axial end of return sleeve 750 toward annular shoulder 781 of tubular receiving portion 761, and at its other axial end is engaged by an annular groove 717 provided in attachment housing 710. Alternatively, return sleeve 750 may be integrally formed on attachment housing 710 and/or may be constructed in one piece therewith.

In addition, provided between annular collar 714 and a securing ring 719 disposed in an outer annular groove 718 of tubular receiving portion 761 is a spring element 780, for example a compression spring, which biases return sleeve 750 with a predetermined spring force in the direction of annular shoulder 781, that is, in direction 198 of FIG. 1. Annular groove 718 is constructed by way of example in the region of an axial end 732 of tubular receiving portion 761 toward angle drive portion 704.

Figure 14:
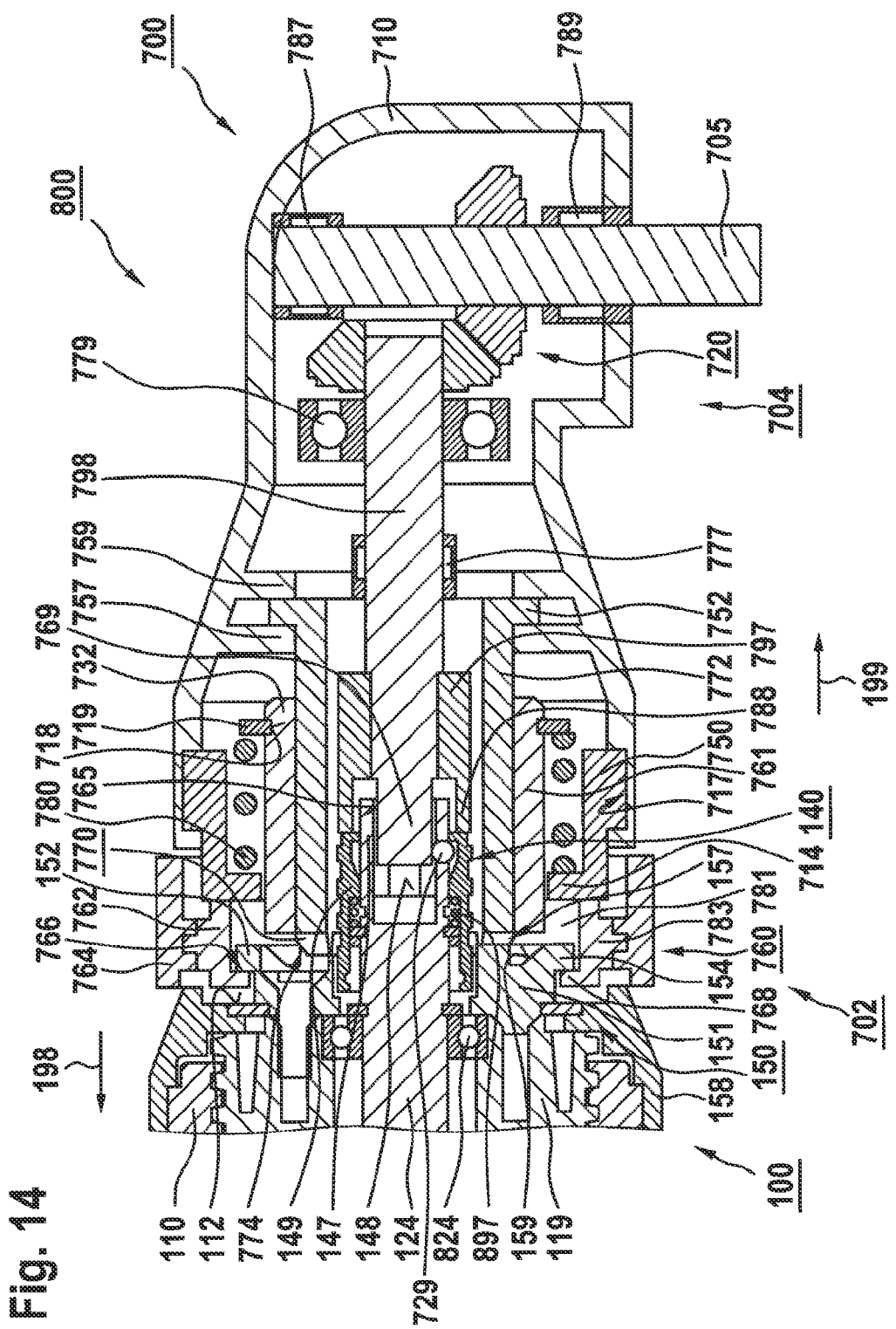
FIG. 14 shows a sectional view of a tool system according to an alternative exemplary embodiment, with the tool attachment of FIG. 13 fastened to the hand-held machine tool of FIG. 1.

FIG. 14 shows an example of a tool system 800 which by way of illustration has hand-held machine tool 100 of FIG. 1 and angle attachment 700 of FIG. 13 to illustrate an example of the mounting of angle attachment 700 on hand-held machine tool 100. Only a portion of the latter is shown, by a detail of housing 110 of FIG. 1 at whose front face 112 machine interface 150 of FIG. 1 is disposed and in which drive shaft 124 is rotatably supported in an illustrative rolling bearing 824, tool holder 140 of FIG. 1 being disposed on drive shaft 124. As described in the case of FIG. 1, according to one exemplary embodiment machine interface 150 is disposed on gear unit housing 119. By way of illustration, fastening element 151 is in this case fastened to gear unit housing 119 by suitable fastening members, for example screws or rivets.

To mount angle attachment 700 on machine interface 150 of hand-held machine tool 100, angle attachment 700 is brought toward machine interface 150 of FIG. 1 in direction 198 of FIG. 1 and is positioned thereon in a predetermined angular position such that widened portion 783 of tubular receiving portion 761 is disposed in the region of fastening element 151 of machine interface 150. In that operation, actuating member 797 of angle attachment 700 is brought by its free end 788 into contact with locking sleeve 149 of tool holder 140 of hand-held machine tool 100, so that free end 769 of drive shaft 798 engages partly in empty internal polygonal receptacle 148 of tool holder 140 and is prevented from engaging completely by locking balls 729 associated by way of example with tool holder 140. Those locking balls 729, or other suitable locking elements, are urged radially inward in a manner known to one skilled in the art, for example, by locking sleeve 149 of tool holder 140 in order in that manner to prevent unimpeded insertion of drive shaft 768 into internal polygonal receptacle 148, locking sleeve 149 being spring-loaded by a spring element 897 in axial direction 199 of FIG. 1 pointing away from hand-held machine tool 100.

In a further step, angle attachment 700 is pushed onto machine interface 150 in the direction of hand-held machine tool 100, that is, in direction 198, for example until widened region 783 of tubular receiving portion 761 rests against fastening element 151 of machine interface 150 so that, by rotation of actuating ring 764 of locking unit 760 of tool attachment 700, bayonets 766, 768 thereof may be brought into engagement with bayonets 152, 154 of fastening element 151 and thus may be locked thereto, so that locking unit 760 is transferred from its unlocked state to the locked state. In that locked state, attachment housing 710 of angle attachment 700 is urged in direction 198 of hand-held machine tool 100 by a predetermined spring force exerted by spring element 780 of locking unit 760 of tool attachment 700.

In addition, as a result of tool attachment 700 being pushed onto machine interface 150, locking sleeve 149 of tool holder 140 is pushed by actuating member 797 of angle attachment 700 in direction 198 against a spring force exerted by spring element 897, so that free end 769 of drive shaft 798 may be pushed into internal polygonal receptacle 148. That makes one-handed mounting of tool attachment 700 on hand-held machine tool 100 possible, drive shaft 798 having clearance tangentially and axially and preferably being received in internal polygonal receptacle 148 of receiving body 147 of tool holder 140 exclusively for transmitting torque.

In addition, sloped centering regions 776, 778 of tubular receiving portion 761 of tool attachment 700 are brought into contact with centering aid 153 of fastening element 151, which centering aid 153 is configured in the manner of an annular cone surface 159. A secure and reliable axial centering of tool attachment 700 at tool holder 140 or rather relative to drive spindle 124 of hand-held machine tool 100 may thus be made possible. In addition, set of angle setting teeth 774 of angle setting element 772 of tool attachment 700 is brought into engagement with angle setting members 157 of fastening element 151. In that manner, the predetermined angular position for operation of tool attachment 700 on hand-held machine tool 100 is established.

Actuating ring 764 of angle attachment 700 and hence entire angle attachment 700 is then released, whereupon actuating member 797 is urged, owing to the spring force of spring element 897, by locking sleeve 149 of tool holder 140 in direction 199, so that entire angle attachment 700 is forced to move axially in direction 199. In that manner, the bayonet connection between bayonets 766, 768 of tool attachment 700 and bayonets 152, 154 of fastening element 151 is additionally secured.

What is claimed is:

1. A tool attachment for fastening to a fastening interface of a hand-held machine tool, comprising:
   a locking unit which in an unlocked state makes it possible for the tool attachment to be placed on the fastening interface of the hand-held machine tool and in a locked state makes it possible for the tool attachment to be locked to the fastening interface of the hand-held machine tool for operation, the locking unit having a rotatable locking body, and a first rotational position of the locking body being associated with the unlocked state and a second rotational position of the locking body being associated with the locked state,
   wherein the locking unit has a locking member which is configured to prevent rotation of the locking body from the second rotational position into the first rotational position in the locked state,
   wherein the locking unit has an actuating element which is configured to make possible a rotation of the locking body from the first into the second rotational position,
   wherein the actuating element further comprises a blocking member which is configured to block the actuating element in a blocking position at the locking body in the locked state, in which blocking position the actuating element urges the locking member at least in portions toward the fastening interface of the hand-held machine tool,
   wherein the blocking member is of a resilient configuration at least in regions and has a blocking portion which in the blocking position may be releasably fixed in a fixing member provided on the locking body.

2. The tool attachment according to claim 1, wherein the locking member is configured to cooperate in the locked state with a locking element associated with the fastening interface of the hand-held machine tool.

3. The tool attachment according to claim 2, wherein the locking element has at least one set of locking teeth.

4. The tool attachment according to claim 3, wherein the locking member is of a resilient configuration at least in regions and has at least one locking portion which in the locked state is urged toward the fastening interface of the hand-held machine tool by an elastic deformation of the locking member.

5. The tool attachment according to claim 4, wherein the locking portion is configured to engage the set of locking teeth in order to prevent the rotation of the locking body from the second rotational position into the first rotational position.

6. The tool attachment according to claim 1, wherein the locking body is at least partly tubular and the actuating element is rotatably supported on an outer periphery of the locking body.

7. The tool attachment according to claim 1, wherein at least one driver element is provided on the actuating element and at least one driven member is provided on the locking body, the driver element and the driven member being configured to cooperate for rotary entrainment of the locking body upon actuation of the actuating element to rotate the locking body from the first into the second rotational position.

8. The tool attachment according to claim 7, wherein the driven member is configured to make possible a rotational movement of the actuating element relative to the locking body at least by a predetermined rotation angle.

9. The tool attachment according to claim 1, wherein the actuating element is configured to urge the locking member in the locked state at least in portions toward the fastening interface of the hand-held machine tool.

10. The tool attachment according to claim 9, wherein the actuating element has a control curve which is configured to enable the locking member to be urged at least in portions toward the fastening interface of the hand-held machine tool in the locked state.

11. The tool attachment according to claim 1, wherein the fixing member is configured in the manner of a recess and the blocking portion is configured to snap into the fixing member in the blocking position in order to prevent automatic rotation of the actuating element relative to the locking body in the locked state.

12. The tool attachment according to claim 1, wherein the locking body has locking elements which are configured in the manner of bayonets to form a bayonet connection with the fastening interface of the hand-held machine tool.

13. A tool attachment for fastening to a fastening interface of a hand-held machine tool, comprising:
   a locking unit which in an unlocked state makes it possible for the tool attachment to be placed on the fastening interface of the hand-held machine tool and in a locked state makes it possible for the tool attachment to be locked to the fastening interface of the hand-held machine tool for operation, the locking unit having a rotatable locking body, and a first rotational position of the locking body being associated with the unlocked state and a second rotational position of the locking body being associated with the locked state, wherein the locking unit has a locking member which is configured to prevent rotation of the locking body from the second rotational position into the first rotational position in the locked state, wherein the locking unit has an actuating element which is configured to make possible a rotation of the locking body from the first into the second rotational position, wherein the actuating element further comprises a blocking member which is configured to block the actuating element in a blocking position at the locking body in the locked state, in which blocking position the actuating element urges the locking member at least in portions toward the fastening interface of the hand-held machine tool, wherein the locking member and the blocking member are constructed in one piece.

14. A tool system, comprising:

a hand-held machine tool which has a fastening interface, and a tool attachment for fastening to the fastening interface of the hand-held machine tool, the tool attachment having a locking unit which in an unlocked state makes it possible for the tool attachment to be placed on the fastening interface of the hand-held machine tool and in a locked state makes it possible for the tool attachment to be locked to the fastening interface of the hand-held machine tool for operation, the locking unit having a rotatable locking body which in the unlocked state is disposed in a first rotational position and in the locked state is disposed in a second rotational position on the fastening interface of the hand-held machine tool, wherein the locking unit has a locking member which is configured to prevent rotation of the locking body from the second rotational position into the first rotational position in the locked state, wherein the locking unit has an actuating element which is configured to make possible a rotation of the locking body from the first into the second rotational position, wherein the actuating element further comprises a blocking member which is configured to block the actuating element in a blocking position at the locking body in the locked state, in which blocking position the actuating element urges the locking member at least in portions toward the fastening interface of the hand-held machine tool, wherein the blocking member is of a resilient configuration at least in regions and has a blocking portion which in the blocking position may be releasably fixed in a fixing member provided on the locking body.

15. A tool system, comprising:

a hand-held machine tool which has a fastening interface, and a tool attachment for fastening to the fastening interface of the hand-held machine tool, the tool attachment having a locking unit which in an unlocked state makes it possible for the tool attachment to be placed on the fastening interface of the hand-held machine tool and in a locked state makes it possible for the tool attachment to be locked to the fastening interface of the hand-held machine tool for operation, the locking unit having a rotatable locking body which in the unlocked state is disposed in a first rotational position and in the locked state is disposed in a second rotational position on the fastening interface of the hand-held machine tool, wherein the locking unit has a locking member which is configured to prevent rotation of the locking body from the second rotational position into the first rotational position in the locked state, wherein the locking unit has an actuating element which is configured to make possible a rotation of the locking body from the first into the second rotational position, wherein the actuating element further comprises a blocking member which is configured to block the actuating element in a blocking position at the locking body in the locked state, in which blocking position the actuating element urges the locking member at least in portions toward the fastening interface of the hand-held machine tool, wherein the locking member and the blocking member are constructed in one piece.

* * * * *